US012304373B2

(12) United States Patent
Ludwig et al.

(10) Patent No.: US 12,304,373 B2
(45) Date of Patent: May 20, 2025

(54) SIDE-FIRING HEADREST LOUDSPEAKER WITH OMNIDIRECTIONAL LENS

(71) Applicant: HARMAN INTERNATIONAL INDUSTRIES, INCORPORATED, Stamford, CT (US)

(72) Inventors: Chris Ludwig, Bloomfield Hills, MI (US); Riley Winton, Opelika, AL (US); Christopher Michael Trestain, Livonia, MI (US); David Mossington, Stamford, CT (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 17/767,375

(22) PCT Filed: Oct. 10, 2019

(86) PCT No.: PCT/US2019/055663
§ 371 (c)(1),
(2) Date: Apr. 7, 2022

(87) PCT Pub. No.: WO2021/071496
PCT Pub. Date: Apr. 15, 2021

(65) Prior Publication Data
US 2024/0101008 A1    Mar. 28, 2024

(51) Int. Cl.
*B60N 2/879*    (2018.01)
*H04R 1/02*    (2006.01)
(Continued)

(52) U.S. Cl.
CPC ............. *B60N 2/879* (2018.02); *H04R 1/023* (2013.01); *H04R 1/345* (2013.01); *H04R 5/023* (2013.01); *H04R 2499/13* (2013.01)

(58) Field of Classification Search
CPC ........ B60N 2/879; H04R 1/023; H04R 1/345; H04R 5/023; H04R 2499/13
See application file for complete search history.

(56) References Cited

U.S. PATENT DOCUMENTS 4,620,317 A * 10/1986 Anderson ............... H04R 1/345
381/160
4,696,370 A * 9/1987 Tokumo .............. B60R 11/0217
181/155

(Continued)

FOREIGN PATENT DOCUMENTS

CN    102316397 A    1/2012
CN    109478404 A    3/2019
(Continued)

OTHER PUBLICATIONS

International Preliminary Report on Patentability for PCT Application No. PCT/US2019/055663, dated Apr. 12, 2022, 9 pages.
(Continued)

*Primary Examiner* — Andrew Sniezek
(74) *Attorney, Agent, or Firm* — Brooks Kushman P.C.

(57) ABSTRACT

In at least one embodiment, a loudspeaker assembly including a first loudspeaker and a first acoustic lens is provided. The first loudspeaker is positioned on a first side of a headrest of a first vehicle seat for transmitting a first audio output toward one of a side pillar and a door of a vehicle. The first acoustic lens is coupled to the first loudspeaker and defining a first opening to enable the first audio output to pass from the first opening at a first predetermined angle. The first acoustic lens is positioned between the first loudspeaker and the one of the side pillar and the door of the vehicle.

22 Claims, 5 Drawing Sheets

(51) Int. Cl.
    *H04R 1/34*           (2006.01)
    *H04R 5/02*           (2006.01)

(56)           References Cited

U.S. PATENT DOCUMENTS

| | | | |
|---|---|---|---|
| 5,031,220 | A | 7/1991 | Takagi et al. |
| 7,508,952 | B2 | 3/2009 | Hofmann et al. |
| 10,643,599 | B2 * | 5/2020 | Sterling .................. G10K 11/30 |
| 2005/0129258 | A1 | 6/2005 | Fincham |
| 2008/0247575 | A1 | 10/2008 | Hutt et al. |
| 2017/0085983 | A1 * | 3/2017 | Kim ....................... H04R 1/288 |
| 2019/0005941 | A1 | 1/2019 | Sterling |
| 2019/0111820 | A1 | 4/2019 | Subat et al. |

FOREIGN PATENT DOCUMENTS

| | | | |
|---|---|---|---|
| CN | 109927600 | A | 6/2019 |
| EP | 2405670 | A1 | 1/2012 |

OTHER PUBLICATIONS

International Search Report dated Dec. 19, 2019 for PCT Appn. No. PCT/US2019/055663 filed Oct. 10, 2019, 13 pages.
First European Office Action dated Apr. 15, 2024 for European Application No. 19795401.9 filed Apr. 7, 2022, 7 pgs.
First Chinese Office Action dated Aug. 28, 2024 for Chinese Application No. 201980101248.8 filed Apr. 11, 2022, 9 pgs.
Third Chinese Office Action dated Apr. 16, 2025 for Chinese Application No. 201980101248.8 filed Apr. 11, 2022, 18 pgs.

* cited by examiner

Fig-10

SIDE-FIRING HEADREST LOUDSPEAKER WITH OMNIDIRECTIONAL LENS

CROSS-REFERENCE TO RELATED APPLICATION

This application is the U.S. National Phase of PCT Appln. No. PCT/US2019/055663, filed on Oct. 10, 2019, and entitled "SIDE-FIRING HEADREST LOUDSPEAKER WITH OMNIDIRECTIONAL LENS", the disclosure of which is hereby incorporated by reference in its entirety.

TECHNICAL FIELD

Aspects disclosed herein generally relate to a loudspeaker system and more particularly to at least one loudspeaker positioned in a headrest of a vehicle that transmits audio data on a side-firing basis in conjunction with an acoustic lens. These aspects and others will be discussed in more detail herein.

BACKGROUND

U.S. Publication No. 200810247575 to Hutt et al. discloses a directional loudspeaker that provides an enhanced listening environment by producing an indirect sound field of greater amplitude than that of the direct sound field. The directional loudspeaker includes loudspeaker elements positioned to provide a listener located below the loudspeaker elements with an impression of sound spaciousness in a vehicle environment. The loudspeaker elements may include baffles or acoustic lenses to deflect the indirect field away from the path to the listener position. The loudspeaker may also be operated with windows open by channeling the indirect sound field through an acoustic waveguide and deflector to the listener. A sound processor is also provided to accept a sound input, create an indirect and direct sound field, output the sound fields to loudspeaker elements, and also may provide electronic enhancement effects such as multi-channel sound or sound parameter adjustment SUMMARY In at least one embodiment, a loudspeaker assembly including a first loudspeaker and a first acoustic lens is provided. The first loudspeaker is positioned on a first side of a headrest of a first vehicle seat for transmitting a first audio output toward one of a side pillar and a door of a vehicle. The first acoustic lens is coupled to the first loudspeaker and defining a first opening to enable the first audio output to pass from the first opening at a first predetermined angle.

In at least another embodiment, a loudspeaker assembly including a first loudspeaker and a first acoustic lens is provided. The first loudspeaker is positioned on a first side of a headrest of a first vehicle seat for transmitting a first audio output toward a second vehicle seat positioned in a same row of the first vehicle seat. The first acoustic lens is coupled to the first loudspeaker and defining a first opening to enable the first loudspeaker to transmit the first audio output from the first opening at a first predetermined angle.

In at least another embodiment, a loudspeaker assembly including a first loudspeaker and a second loudspeaker is provided. The first loudspeaker is positioned on a first side of a headrest of a first vehicle seat for transmitting a first audio output toward one of a side pillar and a door of a vehicle. The second loudspeaker is positioned on a second side of the headrest for transmitting a second audio output toward a second vehicle seat positioned in a same row of the first vehicle seat. The second side of the headrest is positioned opposite to the first side of the headrest.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that directional terms as noted herein (e.g., "upper", "lower", "inner", "outer", "top", "bottom", etc.) simply refer to the orientation of various components as illustrated in the accompanying figures and the manner in which at least one loudspeaker and at least one vehicle headrest may be orientated relative to the vehicle. Such terms are provided for context and understanding of the embodiments disclosed herein.

Aspects disclosed herein generally provide, but not limited to, a side-oriented loudspeaker configuration for automotive headrests. In typical automotive contexts, loudspeakers positioned within headrest can be used to provide surround or ambience audio content for vehicle occupants. Additionally, such headrest-based loudspeakers may be used to convey messaging, prompts, or driver-assistance-related audio signals to the driver or other passengers. In general, the loudspeakers that are positioned in the headrest may be are arranged such that the loudspeakers may be pointed toward the front of the vehicle (i.e., toward the listeners' ears (or toward the back of the listener's head or front windshield of the vehicle)). The aspects disclosed herein may provide a configuration in which the loudspeakers are positioned on side portions of the headrest toward a side portion of the vehicle (e.g., toward vehicle doors).

With the side-orientated loudspeaker in the headrest, and in conjunction with an acoustic lens, such an implementation may yield similar experiential qualities while solving safety and packaging related challenges. The type of acoustic lens implemented in connection with the loudspeaker may change a directivity of the loudspeaker to match or achieve the desired audio experience. For example, an omnidirectional acoustic lens may be utilized to provide an even frequency response for occupants in the vehicle. For a more targeted experience in the front row seats only, a 180 or 270 degrees (or other suitable angle) focused acoustic lens may be used to redirect the acoustic output to the front of the vehicle rather than to a rear of the vehicle.

The side-orientated loudspeaker may solve various automotive packaging challenges. Specifically, the headrests are a zone for crash and safety considerations. Therefore, positioning loudspeakers and speaker grills on a front face of the headrests may have to be avoided. By mounting the loudspeakers on a side of the headrest, it is generally possible to avoid the overall concern of packaging loudspeakers on the headrest with less constraint on the acoustic and industrial design of the loudspeaker.

Additionally, current headrest speaker technologies generally only provide audio content for the occupant seated directly in front of the loudspeakers. Such an aspect may limit the user experiential quality of the system, as well as drive up cost and complexity of the system in order to compensate for this effect. One advantage offered by the side-firing loudspeaker system is that the front-mounted-headrest-speaker safety challenges may be inherently solved. In addition, loudspeaker system configurations may be lighter and less complex while still achieving comparable audio performance. Vehicle designers may have greater flexibility in their visual designs, as they may not constrained by typical safety concerns. Finally, the acoustic lenses as positioned in the headrests may be stylized to a greater extent as the acoustic lenses may have better sightlines than those positioned in the front face of the headrest.

Figure 1:
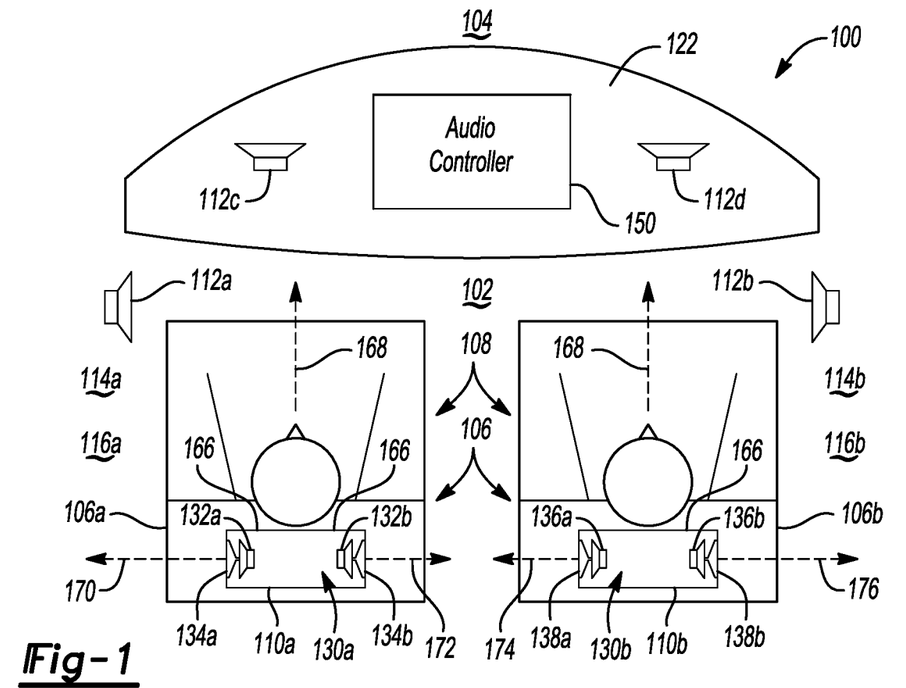
FIG. 1 generally depicts a vehicle audio system in accordance to one embodiment.

FIG. 1 generally depicts a vehicle audio system 100 in a listening environment 102 of a vehicle 104 in accordance to one embodiment. The listening environment 102 includes a plurality of vehicle seats 106 (e.g., a first seat 106a and a second seat 106b) positioned in a first row 108 of the vehicle 104. It is recognized that the number of seats 106 and rows 108 in the vehicle 104 may vary based on the particular implementation of the vehicle 104. The first seat 106a is substantially adjacent to the second seat 106b. The first seat 106a may be a driver seat and the second seat 106b may be a front passenger seat. The first seat 106a may include a first headrest 110a and the second seat 106b may include a second headrest 110b. As illustrated, the first seat 106a and the second seat 106b may be substantially aligned in the first row 108. Additional rows (not shown) may include additional seats (not shown) and the additional rows may be positioned behind the row 108 (e.g., first row 108) in the vehicle 104.

The vehicle 104 includes a plurality of loudspeakers 112 (e.g., a first loudspeaker 112a, a second loudspeaker 112b, a third loudspeaker 112c, and a fourth loudspeaker 112d) positioned within the listening environment 102. The first loudspeaker 20a may be proximal to the first seat 106a and distal to the second seat 106b. The second loudspeaker 112b may be proximal to the second seat 106b and distal to the first seat 106a. The first loudspeaker 112a may be located in a left-hand door 114a and/or on a vehicle structural member such as, for example, a body pillar (i.e., A-pillar or B-pillar) 116a located adjacent to a driver side of the vehicle 104. Likewise, the second loudspeaker 112b may be located in a right-hand door 114b and/or on the vehicle structural member such as, for example, a body pillar (i.e., A-pillar or B-pillar) 116b located adjacent to a front passenger side of the vehicle 104. The third loudspeaker 112c and the fourth loudspeaker 112b may be positioned on an instrument panel 122 of the vehicle 104.

The first headrest 110a generally includes a first loudspeaker assembly 130a and the second headrest 110b generally includes a second loudspeaker assembly 130b. The first loudspeaker assembly 130a generally includes a first plurality of headrest loudspeakers 132a-132b and a first plurality of acoustic lens 134a-134b. As shown, the acoustic lens 134a is coupled to the headrest loudspeaker 132a and the acoustic lens 134b is coupled to the headrest loudspeaker 132b. In a similar manner, the second loudspeaker assembly 130b generally includes a second plurality of headrest loudspeakers 136a-136b and a second plurality of acoustic lens 138a-138b. As shown, the acoustic lens 138a is coupled to the headrest loudspeaker 136a and the acoustic lens 138b is coupled to the headrest loudspeaker 136b. It is recognized that the number of headrest loudspeakers positioned within each of the headrests 110a, 110b may vary based on the desired criteria of a particular implementation.

An audio controller 150 is operably coupled to the loudspeakers 112 and to the headrest loudspeakers 132. The audio controller 150 transmits an audio signal to the loudspeakers 112 and the headrest loudspeakers 132, 136. The loudspeakers 112, 132, and 136 playback audio data in the listening environment 12 in response to the audio signal. The audio controller 150 generally processes information used in connection with an AM radio, FM radio, satellite radio, navigation system, user interface, display, wireless communication with mobile devices via Bluetooth, WiFi or other wireless protocols, etc.

An audio amplifier (not shown) is operably coupled to the audio controller 150. The audio amplifier may be integrated with the audio controller 150. In another embodiment, the audio amplifier may be positioned exterior to the audio controller 150. The audio amplifier is generally configured to receive an audio output from the audio controller 150 and to amplify the amplitude for the audio output to a level that is adequate to drive the various loudspeakers 112 and the headrest loudspeakers 132, 136. It is recognized that the audio controller 150 may generally include any number of hardware-based processors and memory. The audio controller 150 may execute any number of software algorithms that are stored on the memory with the various hardware-based processors to provide surround sound, audio tuning, such as for gain, EQ, or any number of various audio adjustments to enhance the listening experience within the listening environment 102. The audio controller 150 may include any number of channels with each corresponding channel being coupled to a respective loudspeaker 112 and to a respective headrest loudspeaker 132, 136 via the audio amplifier 27 for transmitting the audio signal to the loudspeakers 112, 132, and 136. The headrest loudspeakers 132, 136 may be used to convey messages, prompts, or driver-assistance-related audio signals to the driver or other passengers in response to audio provided by the audio controller 150.

In general, each of the headrest loudspeakers 132, 136 may generally be defined as side-firing loudspeakers since loudspeakers 132, 136 are orientated to transmit audio within the listening environment 102 from a side portion of the headrest 110a, 110b. Each headrest 110a, 110b includes a front side 166 that is orientated in a front direction 168 that faces the front of the vehicle 104 (or the instrument panel 122). As shown, the headrest loudspeaker 132a as positioned in the headrest 110a is generally configured to transmit audio data in a first side direction 170 toward the left-hand door 114a and/or the body pillar (i.e., A-pillar or B-pillar) 116a located adjacent to the driver side of the vehicle 104. In this case, the headrest loudspeaker 132a transmits audio data in the first side direction 170 that may be orthogonal to the front direction 168 (e.g., the direction of the front side 166 of the headrest 110a). In addition, the headrest loudspeaker 132b as positioned in the headrest 110a is generally configured to transmit audio data in a second side direction 172 toward the headrest 110b of the seat 106b and toward the right-hand door 114b and/or the body pillar (i.e., A-pillar or B-pillar) 116b located adjacent to the front passenger side of the vehicle 104. In this case, the headrest loudspeaker 132b transmits the audio data in the second side direction 172 that may be orthogonal to the front direction 168 (e.g., the direction of the front side 166 of the headrest 110a).

In addition, the headrest loudspeaker 136a as positioned in the headrest 110b is generally configured to transmit audio data in a third side direction 174 toward the headrest 110a and toward the left-hand door 114a and/or the body pillar (i.e., A-pillar or B-pillar) 116a located adjacent to the driver side of the vehicle 104. In this case, the headrest loudspeaker 136a transmits audio data in the third side direction 174 that may be orthogonal to the front direction 168 (e.g., the direction of the front side 166 of the headrest 110b). Additionally, the headrest loudspeaker 136b as positioned in the headrest 110b is generally configured to transmit the audio data in a fourth side direction 176 toward the right-hand door 114b and/or the body pillar (i.e., A-pillar or B-pillar) 116b located adjacent to the front passenger side of the vehicle 104. In this case, the headrest loudspeaker 136b transmits the audio data in the fourth side direction 176 that is orthogonal to the front direction 168 (e.g., the direction of the front side 166 of the headrest 110b).

For each of the headrest loudspeakers 132a, 132b, 136a, 136b, the corresponding acoustic lens 134a, 134b, 138a, 138b, respectively, is mechanically coupled thereto to enable the audio data to pass therethrough in accordance to the directions 170, 172, 174, 176. Depending on the configuration of the acoustic lens 134a, 134b, 138a, 138b; the headrest loudspeakers 132a, 132b, 136a, 136b may provide for an omnidirectional field of the transmission of the audio data (e.g., 360 degrees transmission of the audio data in the directions 170, 172, 174, 176). Alternatively, depending on the configuration of the acoustic lens 134a, 134b, 138a, 138b, the headrest loudspeakers 132a, 132b, 136a, 136b may also provide for varying degrees of transmission of the audio data (e.g., 90, 180, 270 etc.) in the directions 170, 172, 174, 176. In general, the direction 170 may correspond to audio being transmitted toward a driver's door of the vehicle. The direction 172 may coincide to the audio being transmitted toward the front passenger seat 106b and generally toward the front passenger door. The direction 174 may coincide to the audio being transmitted toward the driver seat 106a and generally toward the driver door. The direction 176 may coincide to the audio being transmitted toward the front passenger seat 106b. It is recognized that the directions of any one or more of the directions 170, 172, 174, 176 of the transmitted audio may or may not have an orientation of 180 degrees from their respective headrests 110a, 110b.

The side arrangement of the headrest loudspeakers 132a, 132b in the headrest 110a and the headrest loudspeakers 136a, 136b in the headrest 110b may provide for a richer audio experience for vehicle passengers. For example, this aspect may create a more dramatic surround sound characteristic particularly in light of the audio being transmitted from other directions of the vehicle 104 from the loudspeakers 112a, 112b, 112c, 112d.

Figure 2:
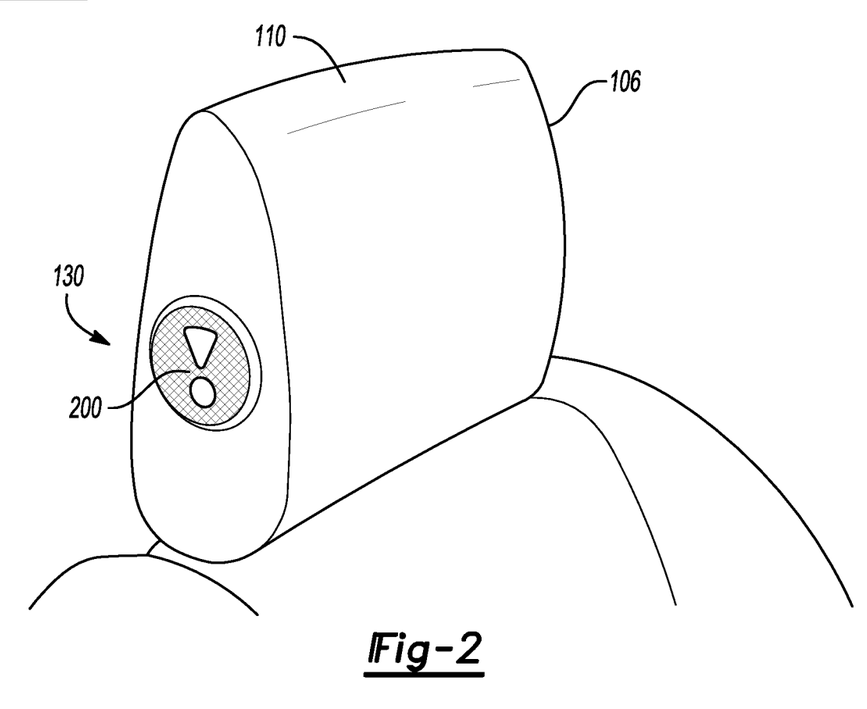
FIG. 2 generally depicts a detailed view of a headrest and a side-firing loudspeaker in accordance to one embodiment.
Figure 3:
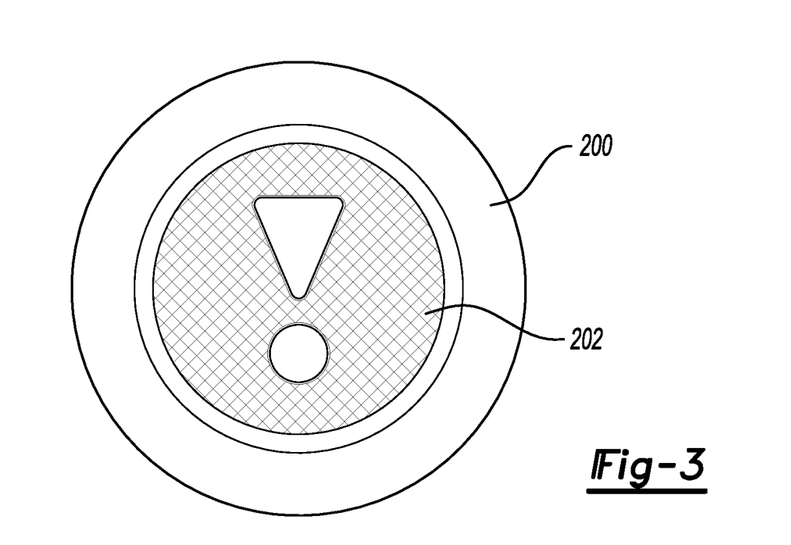
FIG. 3 depicts a more detailed view of the cap in accordance to one embodiment.

FIG. 2 generally depicts a detailed view of the headrest 110a, 110b ("110") and a loudspeaker assembly 130a, 130b ("130") in accordance to one embodiment. While not shown in FIG. 1, the loudspeaker assembly 130 generally includes a cap 200 that is positioned over the acoustic lens 134 and/or 138 and the headrest loudspeakers 132 and 136. The cap 200 may be visible to the driver and to vehicle occupants. The cap 200 may be translucent and enables light to pass therethrough. The cap 200 may be formed of an acoustically opaque material that prevents sound from passing therethrough. The cap 200 may be modified to meet any industrial strategy that is desired by an original equipment manufacturer (OEM). The cap 200 may be formed of rubber, plastic, wood, aluminum, etc. to prevent sound from passing through the cap 200. FIG. 3 depicts a more detailed view of the cap 200. The cap 200 may include a logo 202 imprinted thereon. The cap 200 may also serve as a protective cap to prevent the intrusion of objects into the headrest loudspeakers 132 and 136 and the acoustic lens 134 and 138.

Figure 4A:
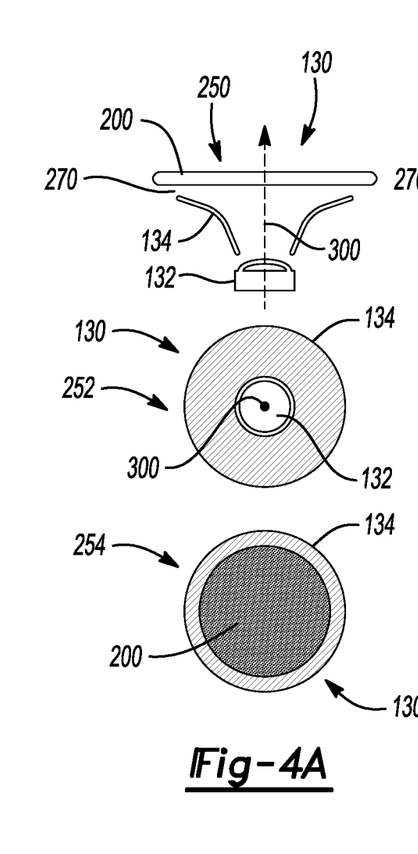
FIGS. 4A-4C generally depict corresponding side and overhead views of an acoustic lens and/or cap with varying degrees of openings in accordance to embodiment.

FIG. 4A depicts various views of the loudspeaker assembly 130 in accordance to one embodiment. At 250, a side view of the loudspeaker assembly 130 is provided. In this case, the loudspeaker assembly 130 illustrates that the acoustic lens 134 defines an opening 270 for enabling audio to pass in all directions (e.g., omnidirectional (or at 360 degrees)) directly below the cap 200. At 252, a top view of the loudspeaker assembly 130 is generally illustrated without the cap 200. The shaded portion within the acoustic lens 134 corresponds to the volume of air that is disposed within the lens 134 for enabling audio to pass omnidirectional from the acoustic lens 134. At 254, a top view of the loudspeaker assembly 130 is generally illustrated with the cap 200. Again, as shown, the acoustic lens 134 enables the audio to pass in a 360 degrees orientation entirely around an outer perimeter of the cap 200.

Figures 4B, 4C:
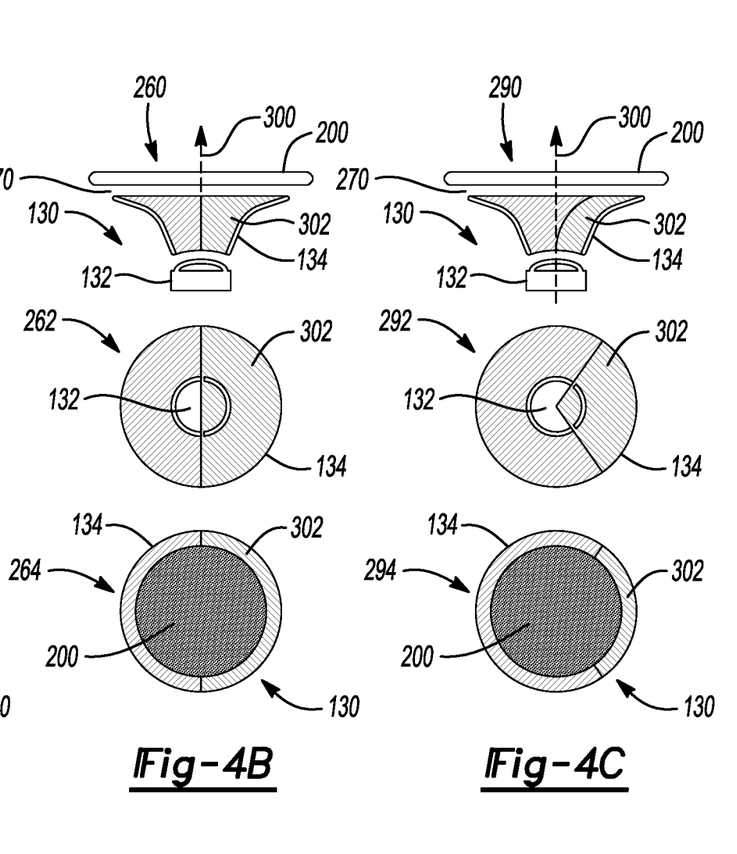

FIG. 4B depicts various views of the loudspeaker assembly 130 in accordance to one embodiment. At 260, a side view of the loudspeaker assembly 130 is provided. In this case, the loudspeaker assembly 130 illustrates that the acoustic lens 134 defines the opening 270 as part of a waveguide (not shown) for enabling audio to pass at an angle of up to 180 degrees around the cap 200. The waveguide of the acoustic lens 134 may generally be formed of an integrated material (or blocking portion) positioned on one side of the acoustic lens 134 to prevent audio from passing through one side of the acoustic lens 134 thereby enabling the audio to pass at the angle of up to 180 degrees. Such a blocking of the audio is generally shown at section 302 within the acoustic lens 134. This aspect will be discussed in more detail below. At 262, a top view of the loudspeaker assembly 130 is generally illustrated without the cap 200. As shown, the loudspeaker 132 transmits audio on a left side of a center axis 300 and the blocking portion of the waveguide prevents audio from passing through the section 302. At 264, a top view of the loudspeaker assembly 130 is generally illustrated with the cap 200. Again, as shown, the acoustic lens 134 enables the audio to pass in a 180 degrees orientation around an outer perimeter of the cap 200.

FIG. 4C depicts various views of the loudspeaker assembly 130 in accordance to one embodiment. At 290, a side view of the loudspeaker assembly 130 is provided. In this case, the loudspeaker assembly 130 illustrates that the acoustic lens 134 defines an opening as part of the waveguide (not shown) for enabling audio to pass at an angle of up to 270 degrees around the cap 200. As noted above, the waveguide of the acoustic lens 134 may generally be formed of an integrated material (or blocking portion) positioned on one side of the acoustic lens 134 to prevent audio from passing through the acoustic lens 134. Such a blocking of the audio is also generally shown at the section 302 within the acoustic lens 134. Again, this aspect will be discussed in more detail below. At 292, a top view of the loudspeaker assembly 130 is generally illustrated without the cap 200. As shown, the loudspeaker 132 transmits audio on the left side of the center axis 300 and on a portion of the right side of the center axis 300 and the blocking portion of the waveguide prevents audio passing through the section 302. At 294, a top view of the loudspeaker assembly 130 is generally illustrated with the cap 200. Again, as shown, the acoustic lens 134 enables the audio to pass in a 270 degrees orientation around an outer perimeter of the cap 200.

Figure 5:
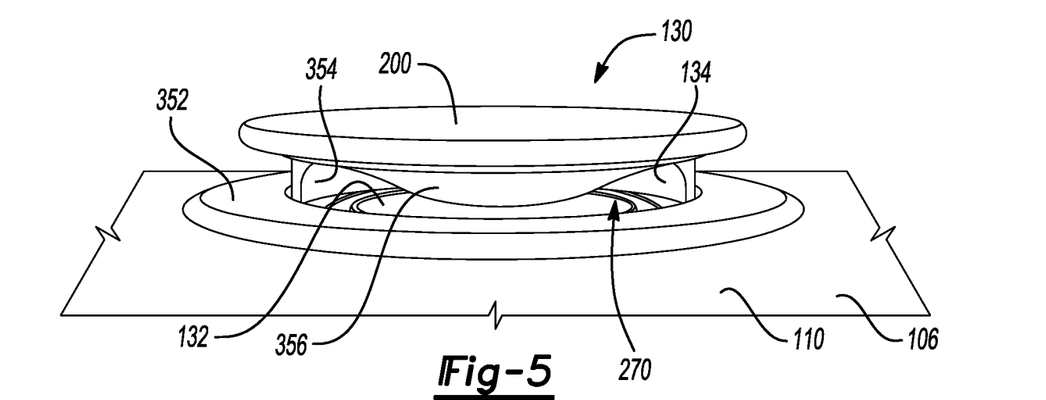
FIG. 5 generally depicts a side view of the acoustic lens and the cap coupled with one another in accordance to one embodiment.
Figure 6:
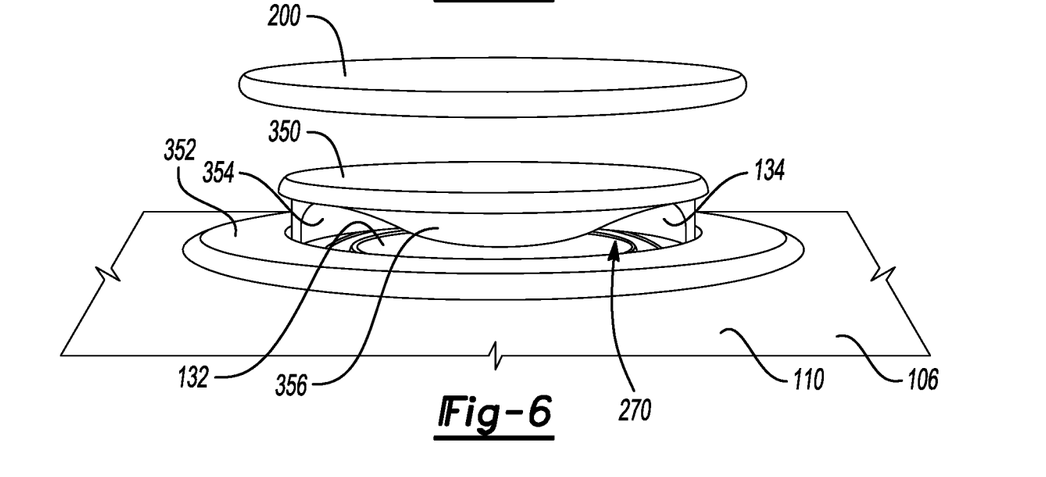
FIG. 6 generally depicts an exploded view of the acoustic lens and the cap in accordance to one embodiment.

FIG. 5 generally depicts a side view of the acoustic lens 134 and the cap 200 coupled with one another and FIG. 6 generally depicts an exploded view of the acoustic lens 134 and the cap 200 in accordance to one embodiment. The acoustic lens 134 generally includes an upper platform 350 and outer ring 352 that are axially spaced apart from one another. The cap 200 may be attached to the upper platform 350 of the acoustic lens 134. In one embodiment, an adhesive may be used to attach the cap 200 to the upper platform 350 of the acoustic lens 134. The outer ring 352 is generally positioned on an outer surface (e.g., leather or other suitable material) of the headrest 110. The acoustic lens 134 generally includes a blocking portion 354 that is sandwiched between the upper platform 350 and the outer ring 352. The blocking portion 354 is configured to control the angle or travel of the audio from the headrest loudspeaker 132 (or 134). In general, the blocking portion 354 may be integrally formed with the acoustic lens 134 to control the angle or travel of the audio from the headrest loudspeaker 132 (or 134) into the opening 270. In the example illustrated in FIGS. 5 and 6, the blocking portion 354 generally extends from 0 to 180 degrees to block audio therefrom. The blocking portion 354 is integrally formed with the upper platform 350 and the outer ring 352 to prevent leakage of audio from the acoustic lens 134. The upper platform 350 includes waveguide 356 that extends from an underside of the upper platform 350 towards the headrest loudspeaker 132. The waveguide 356 may be dome shaped and may also constructed of an acoustically opaque materials to redirect audio (or acoustic energy) from the headrest loudspeaker 132 around an outer perimeter and out of the opening 270 of the acoustic lens 134. In this case, the waveguide 356 redirects acoustic energy 180 degrees around the outer perimeter of the acoustic lens 134. The waveguide 356 may be integrally formed with the acoustic lens 134. In general, the waveguide 356 may be arranged to redirect the acoustic energy off axis in relation to a center axis that impinges the headrest loudspeaker 132.

Figure 7:
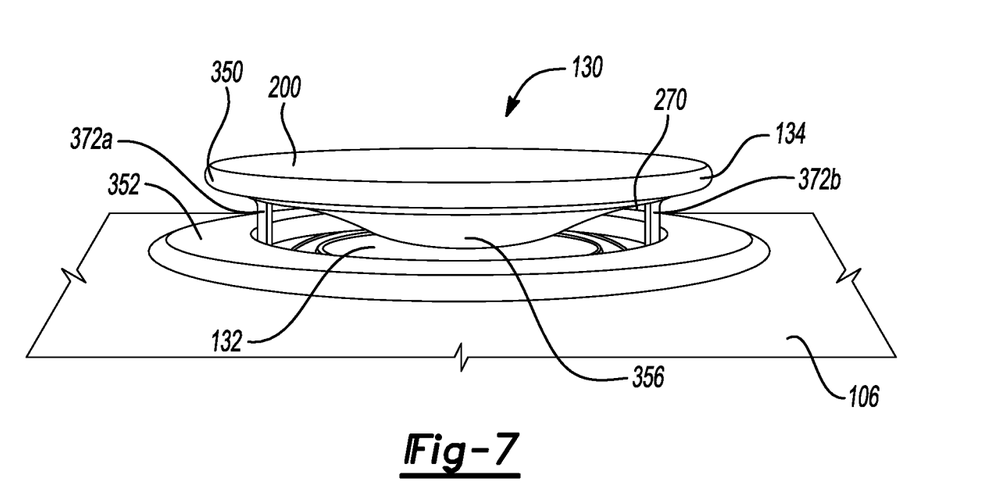
FIG. 7 generally depicts another side view of the acoustic lens and the cap coupled with another in accordance to one embodiment.

FIG. 7 generally depicts another side view of the acoustic lens 134 and the cap 200 coupled with another in accordance to one embodiment. In general, the implementation as illustrated in FIG. 7 is similar to that depicted in FIGS. 5 and 6. However, with the implementation shown in FIG. 7, the acoustic lens 134 does not include the blocking portion 354. Rather, the acoustic lens 134 is arranged to enable audio to pass from the opening 270 formed by the acoustic lens 134 in a direction or angle that spans generally 360 degrees. The acoustic lens 134 includes posts 372a, 372b to couple the upper platform 350 to the outer ring 352. The posts 372a, 372b are integrated with the upper platform 350 and the outer ring 352. A side view of the posts 372a, 372b are generally illustrated in connection with FIG. 8.

Figure 8:
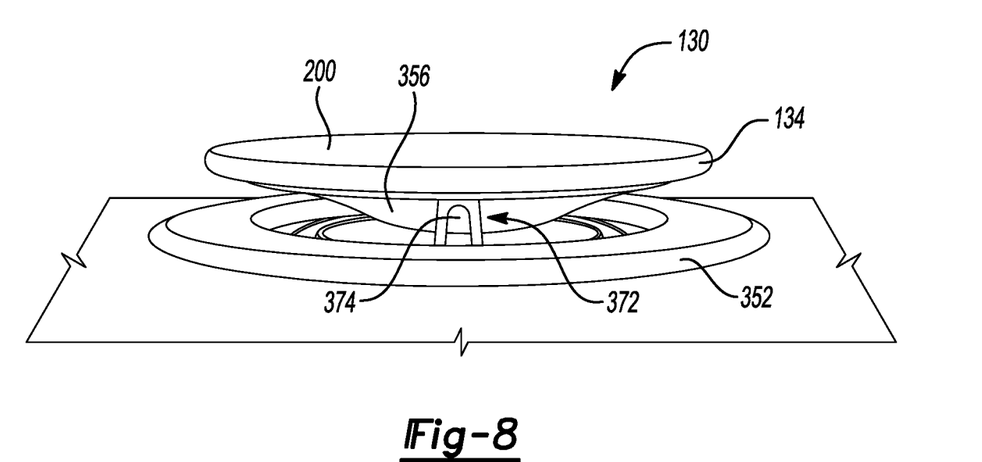
FIG. 8 generally depicts another side view of the acoustic lens and the cap coupled together via posts in accordance to one embodiment.

In general, each post 372a, 372b has a considerably smaller profile than that of the blocking portion 354 to facilitate the transmission of as much of the audio output from the acoustic lens 134 in the omnidirectional configuration. Each post 372a, 372b generally defines or forms an opening 374 positioned between the upper platform 350 and the outer ring 352 to enable the flow of audio from the acoustic lens 134. It is recognized that the post 372 may be arranged as a continuous column-like shape (e.g., without the opening 374). The post 372 in this instance may have a smaller footprint to enable audio to pass around the post 372 in the omnidirectional configuration.

Figure 9:
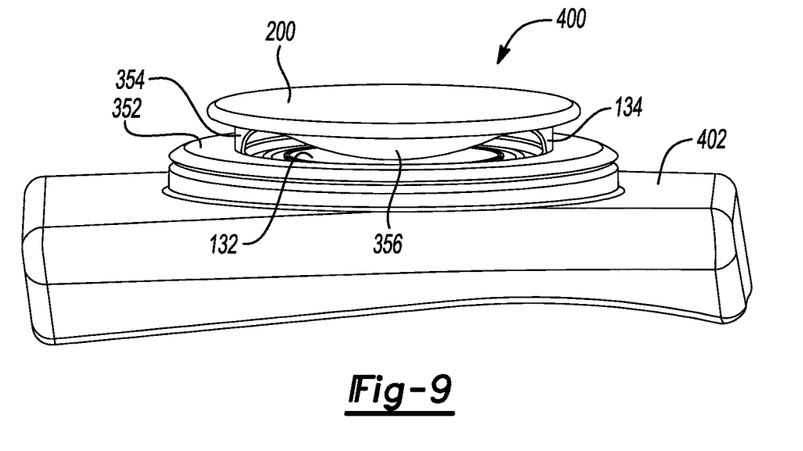
FIG. 9 generally depicts a side view of the loudspeaker assembly in accordance to one embodiment.

FIG. 9 generally depicts a side view of a loudspeaker assembly 400 in accordance to one embodiment. The loudspeaker assembly 400 may be generally include all of the features noted above in connection with the loudspeaker assemblies 130a, 130b. However, the loudspeaker assembly 400 includes an enclosure 402 that may be embedded in on a side portion of the headrest 110. The enclosure 402 generally includes electronics (not shown) and wiring (also not shown) that enable the loudspeaker 132 to transmit audio. The enclosure 402 also defines a cavity for air for the transducer of the headrest loudspeaker 132 to enable the transducer to experience the desired degree of excursion.

Figure 10:
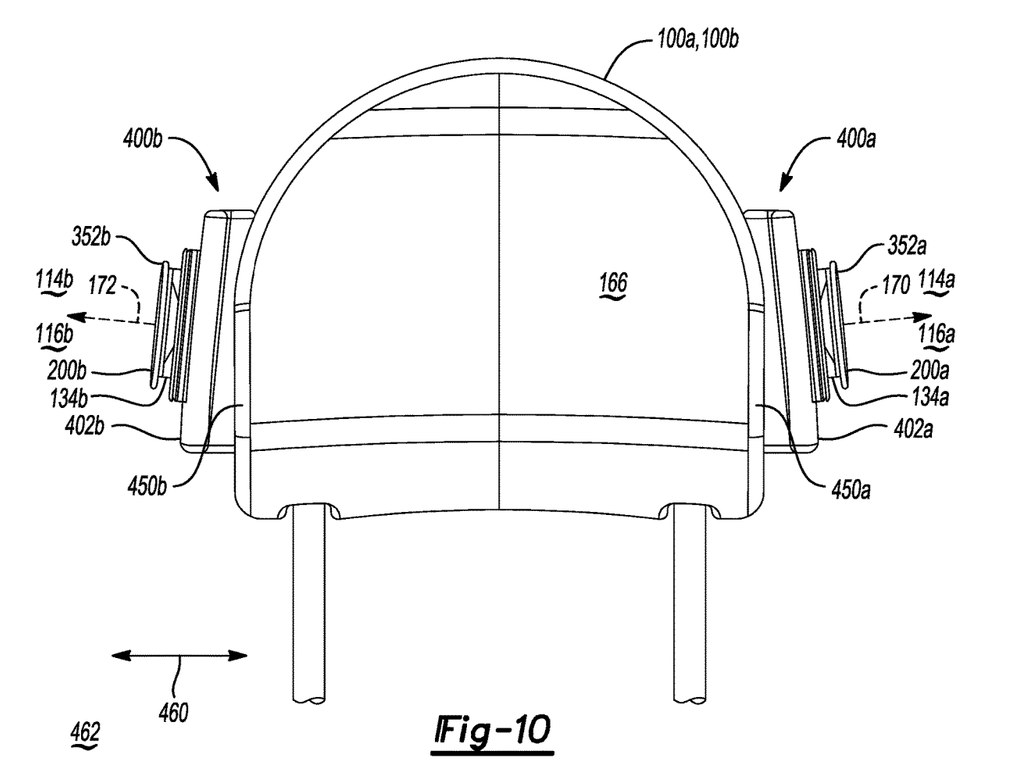
FIG. 10 generally depicts a view of a headrest including a corresponding loudspeaker assembly positioned on side portions thereof in accordance to one embodiment.

FIG. 10 generally depicts a view of the headrest 110a (or 110b) (hereafter 110) including a corresponding loudspeaker assembly 400a, 400b positioned on side portions 450a, 450b thereof in accordance to one embodiment. The front side of the headrest 110 is generally orientated to project out of the page. It is contemplated that leather or other suitable surface of the headrest 110 may be positioned over the enclosures 402a, 402b and the only the caps 200a, 200b and corresponding outer rings 352a, 352b may be visible to vehicle occupants. As shown and also discussed in connection with FIG. 1, the loudspeaker assembly 400a and its corresponding headrest loudspeaker (not shown) is generally configured to transmit audio data in a first side direction 170 toward the left-hand door 114a and/or the body pillar (i.e., A-pillar or B-pillar) 116a that is located directly adjacent to the driver side of the vehicle 104. In addition, the loudspeaker assembly 400b and its corresponding headrest loudspeaker (now shown) is generally configured to transmit audio data in the second side direction 172 toward the headrest 110b and toward the right-hand door 114b and/or the body pillar (i.e., A-pillar or B-pillar) 116b located adjacent to the front passenger side of the vehicle 104. The headrest loudspeakers for each loudspeaker assembly 400a, 400b may be positioned on the headrest 110 to transmit the audio data at an angle that is greater than 90 degrees with respect to an axis 460 that extends on a floor 462 of the vehicle assuming the axis 460 makes up at least a portion of the floor 462 that extends at an angle of 180 degrees. It is also recognized that the headrest loudspeakers for each loudspeaker assembly 400a, 400b may be positioned on the headrest 110 to transmit the audio data at an angle that is approximately equal to (or equal to) 90 degrees with respect to the axis 460. Conversely, the headrest loudspeakers for each loudspeaker assembly 400a, 400b may be positioned on the headrest 110 to transmit the audio date at an angle that is less than 90 degrees with respect to the axis 460.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A loudspeaker assembly comprising:
   a first loudspeaker for being positioned on a first side of a headrest of a first vehicle seat for transmitting a first audio output toward one of a side pillar and a door of a vehicle; and
   a first acoustic lens coupled to the first loudspeaker and defining a first opening to enable the first audio output to pass from the first opening at a first predetermined angle,
   wherein the first acoustic lens includes an upper platform and outer ring that are axially spaced apart from one another,
   wherein the upper platform and the outer ring define the first opening of the first acoustic lens and the upper platform at least partly directs the first audio output through the first opening,
   a blocking portion positioned between the outer ring and the upper platform,
   wherein the blocking portion is continuous and extends radially at an angle of between 30 and 180 degrees to prevent the first audio output from leaking from at least a portion of the first acoustic lens, and
   wherein at least the upper platform and the blocking portion define the first opening to enable the first audio output to pass from the first opening at the first predetermined angle; and
   a cap being attached to an outermost surface of the upper platform and being configured to block the first audio output.

2. The loudspeaker assembly of claim 1 further comprising a second loudspeaker for being positioned on a second side of the headrest of the first vehicle seat for transmitting a second audio output toward a second vehicle seat that is positioned directly adjacent to the first vehicle seat.

3. The loudspeaker assembly of claim 2, wherein the second side of the headrest is positioned opposite to the first side of the headrest.

4. The loudspeaker assembly of claim 3 further comprising a second acoustic lens coupled to the second loudspeaker and defining a second opening to enable the second loudspeaker to transmit the second audio output from the second opening at a second predetermined angle.

5. The loudspeaker assembly of claim 4, wherein the first predetermined angle is similar to the second predetermined angle.

6. The loudspeaker assembly of claim 1, wherein the first acoustic lens includes a blocking portion to block transmission of the first audio output at an outer perimeter of the first acoustic lens.

7. The loudspeaker assembly of claim 1, wherein the first loudspeaker is configured to transmit the first audio on a first axis that extends through a center thereof toward the one of the side pillar and the door of the vehicle, and
   wherein the first acoustic lens includes a waveguide positioned thereon that redirects the first audio in a direction that is offset from the first axis.

8. The loudspeaker assembly of claim 1,
   wherein the upper platform includes a first side and a second side;
   wherein the first side is opposite to the second side; and
   wherein the upper platform receives a waveguide on the first side and the cap on the second side.

9. The loudspeaker assembly of claim 1, wherein the first acoustic lens is positioned between the first loudspeaker and the one of the side pillar and the door of the vehicle.

10. The loudspeaker assembly of claim 1, wherein the cap is formed of an acoustically opaque material to prevent the first audio output from passing therethrough.

11. A loudspeaker assembly comprising:
    a first loudspeaker for being positioned on a first side of a headrest of a first vehicle seat for transmitting a first audio output toward a second vehicle seat positioned in a same row of the first vehicle seat; and
    a first acoustic lens coupled to the first loudspeaker and defining a first opening to enable the first loudspeaker to transmit the first audio output from the first opening at a first predetermined angle,
    wherein the first acoustic lens includes an upper platform and outer ring that are axially spaced apart from one another; and
    a blocking portion positioned between the outer ring and the upper platform,
    wherein the blocking portion is continuous and extends radially at an angle of between 30 and 180 degrees to prevent the first audio output from leaking from at least a portion of the first acoustic lens, and
    wherein the upper platform, the outer ring, and the blocking portion define the first opening to enable the first audio output to pass from the first opening at the first predetermined angle; and
    a cap being attached to an outermost surface of the upper platform and being configured to block the first audio output.

12. The loudspeaker assembly of claim 11 further comprising a second loudspeaker for being positioned on a second side of the headrest of the first vehicle seat for transmitting a second audio output toward one of a side pillar and a door of a vehicle.

13. The loudspeaker assembly of claim 12, wherein the second side of the headrest is positioned opposite to the first side of the headrest.

14. The loudspeaker assembly of claim 13 further comprising a second acoustic lens coupled to the second loudspeaker and defining a second opening to enable the second loudspeaker to transmit the second audio output from the second opening at a second predetermined angle.

15. The loudspeaker assembly of claim 14, wherein the first predetermined angle is similar to the second predetermined angle.

16. The loudspeaker assembly of claim 11, wherein the first acoustic lens includes a blocking portion to block transmission of the first audio output at an outer perimeter of the first acoustic lens.

17. The loudspeaker assembly of claim 11, wherein the first loudspeaker is configured to transmit the first audio on a first axis that extends through a center thereof toward the second vehicle seat, and
    wherein the first acoustic lens includes a waveguide positioned thereon that redirects the first audio in a direction that is offset from the first axis.

18. The loudspeaker assembly of claim 17, wherein the waveguide is positioned directly over the first loudspeaker.

19. The loudspeaker assembly of claim 17, wherein the first acoustic lens is positioned between the first loudspeaker and the second vehicle seat in the same row as the first vehicle seat.

20. The loudspeaker assembly of claim 11, wherein the cap is formed of an acoustically opaque material to prevent the first audio output from passing therethrough.

21. A loudspeaker assembly comprising:
a first loudspeaker for being positioned on a first side of a headrest of a first vehicle seat for transmitting a first audio output toward one of a side pillar and a door of a vehicle;
a first acoustic lens coupled to the first loudspeaker and defining a first opening to enable the first loudspeaker to transmit the first audio output from the first opening;
a second loudspeaker for being positioned on a second side of the headrest for transmitting a second audio output toward a second vehicle seat positioned in a same row of the first vehicle seat,
wherein the second side of the headrest is positioned opposite to the first side of the headrest,
wherein the first acoustic lens includes an upper platform and outer ring that are spaced apart from one another,
wherein the upper platform and the outer ring define the first opening of the first acoustic lens and the upper platform at least partly directs the first audio output through the first opening,
a blocking portion positioned between the outer ring and the upper platform,
wherein the blocking portion is continuous and extends radially at an angle of between 30 and 180 degrees to prevent the first audio output from leaking from at least a portion of the first acoustic lens, and
wherein at least the upper platform and the blocking portion define the first opening to enable the first audio output to pass from the first opening at a first predetermined angle; and
a cap being attached to an outermost surface of the upper platform and being configured to block the first audio output.

22. The loudspeaker assembly of claim 21, wherein the cap is formed of an acoustically opaque material to prevent the first audio output from passing therethrough.

* * * * *